_United States Patent_ [19]

Kuehne et al.

[11] Patent Number: 4,948,604
[45] Date of Patent: Aug. 14, 1990

[54] SHRINK PACKAGE OF IMPROVED PRODUCT TO CONTAINER FIT

[75] Inventors: Richard O. Kuehne, Taylors; Karl R. Deily, Greenville; Timothy L. Lawlis, Chesnee, all of S.C.

[73] Assignee: W.R. Grace & Co.-Conn., Duncan, S.C.

[21] Appl. No.: 313,940

[22] Filed: Feb. 22, 1989

[51] Int. Cl.$^5$ ............................................. B65B 53/02
[52] U.S. Cl. ...................................... 426/107; 426/127; 426/129; 426/234; 426/410; 426/415; 53/442
[58] Field of Search .............. 426/106, 107, 127, 129, 426/410, 415, 234, 243, 241; 53/442

[56] References Cited

U.S. PATENT DOCUMENTS

| | | | |
|---|---|---|---|
| 3,741,253 | 6/1973 | Brax et al. | 138/137 |
| 4,064,296 | 12/1977 | Bornstein et al. | 428/35 |
| 4,411,919 | 10/1983 | Thompson | 426/412 |
| 4,448,792 | 5/1984 | Schirmer | 426/113 |
| 4,469,742 | 9/1984 | Oberle et al. | 428/215 |
| 4,586,320 | 5/1986 | Takai et al. | 53/512 |
| 4,606,922 | 8/1986 | Schirmer | 426/412 |
| 4,695,491 | 9/1987 | Kondo et al. | 428/35 |
| 4,820,536 | 4/1989 | Lippincott et al. | 426/412 |

_Primary Examiner_—Donald E. Czaja
_Assistant Examiner_—Evan Federman
_Attorney, Agent, or Firm_—John J. Toney; William D. Lee, Jr.; Jennifer L. Skord

[57] ABSTRACT

A package of shrunken heat-shrinkable flexible film conformed to a contained food product has no gap or virtually no gap between the food product and the shrunken film. Prior to heat shrinking, the package is subjected to non-ionizing radiation.

10 Claims, No Drawings

SHRINK PACKAGE OF IMPROVED PRODUCT TO CONTAINER FIT

This invention relates to packages of heat-shrinkable flexible polymeric film having a food product enclosed therein. More particularly, the package has been microwaved and then shrunk. The film is relatively transparent to microwave radiation. As a result, a tight fit, with little or no gap between the shrunken film and the food product, occurs. The invention is particularly suitable for when the food product is ham.

BACKGROUND OF THE INVENTION

Heat shrinkable polymer films have gained substantial acceptance for such uses as the packaging of meats. This description will detail the usage of films for packaging meats; it being understood that these films are also suitable for packaging other food products. Some of the films embodying this invention are typically used as heat shrinkable bags supplied to the meat packer with one open end, to be closed and sealed after insertion of the meat. After the produce is inserted, air is normally evacuated, the open end of the bag is closed, such as by heat sealing, or applying a metal clip, and finally heat is applied, such as by hot water, to initiate film shrinkage about the meat.

In subsequent processing of the meat, the bag may be opened and the meat removed for further cutting of the meat into user cuts, for retail sale, for example, or for institutional use.

Successful shrink bags must satisfy a multiplicity of requirements imposed by both the bag producer and the bag user. The bag must be strong to protect the meat. However, it is also desirable to have a package that is attractive. After shrinking, the tighter the fit of the package film to the meat, the better the appearance. A tight fit eliminates gapping areas where unsightly purge can collect. On the other hand, the tight fit must not cause the bag to exhibit such a level of shrink energy as would cause the film to pull apart or delaminate during shrinkage, under its own internal forces.

Conventional shrink bags have generally been constructed with ethylene vinyl acetate copolymers (EVA). In some cases the bags contain a layer of a copolymer to serve as an oxygen barrier. Ethylene vinyl alcohol copolymer (EVOH) has been suggested as the barrier layer, and so has polyvinylidene chloride copolymer (PVDC).

A heat shrinkable, thermoplastic, barrier packaging film for making bags which has enjoyed considerable commercial success is described in U.S. Pat. No. 3,741,253 issued on June 26, 1973 to Brax et al, which relates to a multilayer film comprising a first outside layer of an irradiated ethylene-vinyl acetate copolymer, a core layer of vinylidene chloride copolymer, and a second outside layer of an ethylene-vinyl acetate copolymer. In manufacturing this type of heat shrinkable film, a tubular orientation process is utilized wherein a tube of the film is biaxially oriented by stretching with internal pressure in the transverse direction and with the use of pinch rolls at different speeds in the machine direction. Then the bubble is collapsed, and the film is wound up as flattened, seamless, tubular film to be used later to make bags, e.g. either end-seal bags typically made by transversely heat sealing across the width of flattened tubing followed by severing the tubing so that the transverse seal forms the bottom of a bag, or side-seal bags in which the transverse seals form the bag sides and one edge of the tubing forms the bag bottom.

This type of bag is typically used by placing the food product in the bag, evacuating the bag, gathering and applying a metal clip around the gathered mouth of the bag to form a hermetic seal, or heat sealing the mouth end of the bag, and then immersing the bag, typically for a few seconds in a hot water bath at approximately the same temperature at which the film was stretch-oriented, typically about 160° to 205° F. (71.1° C. to 96.1° C.), hot water immersion being one of the quickest and most economical means of transferring sufficient heat to the film to shrink it uniformly.

One use of such bags is in the shrink packaging of hams. Moist meat, particularly moist ham, can be an excellent growing environment for Listeria, a bacterium that can cause pregnant women to miscarry or cause encephalitis. Thus, ham is commonly subjected to drying to reduce the moisture content thereof prior to shrink packaging. However, when the drier hams are shrink packaged, the bag as it shrinks cannot slip across the drier ham as easily as it could across a moister ham. The product to container fit is not as tight as desired. Gapping areas occur where unsightly purge can collect. Attempts have been made to reduce the gap. One such attempt has been by holding a packaged ham for 0.5 hour or so prior to hot water shrinking of the bag to allow residual moisture inside the ham to permeate to the ham surface. This somewhat reduces the gap but sometimes the same amount of gap occurs whether the package has been held or not. Moreover, the holding time increases the packaging time, and thus fewer hams per unit time can be packaged. This increases the cost of shrink packaged ham. Furthermore, the gap is never completely eliminated.

Thus, it is desired to find a way which reduces the gap so that it is completely eliminated or which once in a while leaves a very minimal gap, yet which is not very time consuming.

Accordingly, it is a general object of the present invention to provide a shrink package wherein undesirable gaps between the shrunken package film and the food product wrapped therein are substantially prevented.

SUMMARY OF THE INVENTION

The invention provides a shrink package having improved product to container fit comprising a heat-shrinkable container including a heat-shrinkable, flexible thermoplastic envelope substantially conformed to a contained food product and having been treated with non-ionizing radiation and then heat shrunk, said non-ionizing radiation being to an extent sufficient to cause substantially complete contact after the heat shrinking of the inner surface of the envelope and the food product whereupon gap therebetween has been substantially prevented.

The invention also provides a method of improving food product to container fit of a shrink package comprising: (a) providing a heat-shrinkable container including a heat-shrinkable flexible thermoplastic envelope and a contained food product enclosed therein, (b) treating said container with non-ionizing radiation, and (c) heat-shrinking said container, whereupon the inner surface of the envelope and the food product are in substantially complete contact to substantially prevent gap therebetween.

Also, the present invention provides for a shrink package having improved food product to container first comprising a heat-shrinkable container including a biaxially heat-shrinkable flexible thermoplastic barrier envelope of at least the 3-layer film structure: polyolefin/polyvinylidene chloride copolymer/polyolefin substantially conformed to a contained meat product and having been treated with microwaving radiation from a level of about 500 watts to a level of about 200 kwatts and then heat shrunk, said microwaving radiation causing substantially complete contact after the heat shrinking of the inner surface of the envelope and the product whereby gap therebetween is less than about 0.32 cm.

Preferably, the non-ionizing radiation is microwaving radiation.

DETAILED DESCRIPTION

Thermoplastic flexible heat-shrinkable films may be manufactured by extrusion (single layer films) or coextrusion (multi-layer films) of thermoplastic resinous materials heated to or above their flow or melting point from an extrusion or coextrusion die in, for example, either tubular or planar (sheet) form, followed by a post extrusion cooling. After the post extrusion cooling, the relatively thick "tape" extrudate is then reheated to a temperature within its orientation temperature range and stretched to orient the material and then cooled. This is colloquially referred to as the "double bubble" technique, and is described in U.S. Pat. No. 3,456,044 (July 15, 1969) and U.S. Pat. No. 3,555,604 (January 19, 1971), both to Pahlke. When the stretching force is applied in one direction monoaxial orientation results, and when simultaneously applied in two directions biaxial orientation results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature. Such material, when heated to an appropriate temperature above room temperature (for example 96° C.), will have a free shrink of about 5% or greater in at least one linear direction. Shrink may be measured in accordance with ASTM D 2732.

Alternative methods of producing films of this type are known to those in the art. One is forming a multilayer film by an extrusion coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer. Exemplary of this method are the laboratory examples of U.S. Pat. No. 3,741,253. This patent is generally representative of an extrusion coating process and is hereby incorporated by reference.

In the preferred embodiments as illustrated in the examples below, the multilayer film contains a barrier layer. The layer is a barrier to fluids such as gas. The barrier layer may be composed of a layer comprising PVDC, or composed of a layer comprising EVOH, or composed of both a layer comprising PVDC and a layer comprising EVOH. Typical comonomers for the polyvinylidene chloride copolymer are vinyl chloride or methyl acrylate, abbreviated herein as PVDC-VCl or PVDC-MA, respectively. PVDC is also commonly known as saran. Also, nylon is useful as a barrier layer. The gas of main concern is oxygen and transmission is considered to be sufficiently low, i.e. the barrier material is relatively gas impermeable, when the transmission rate is below 70 cc/m$^2$mil thickness/24 hours/atms, as measured according to the procedures of ASTM Method D-3985.

A coextruded tube having a PVDC barrier layer may be post irradiated with ionizing radiation. However, if PVDC is employed instead of or together with EVOH as the barrier layer, then any ionizing irradiation preferably should take place prior to application of the PVDC layer to avoid degradation thereof. This degradation may be avoided by using extrusion coating. Accordingly, one may first extrude or coextrude a first layer or layers, subject that layer or layers to high energy electron irradiation and thereafter extrusion coat the PVDC barrier layer and, for that matter, simultaneously or sequentially extrusion coat other later layers (which may or may not have been irradiated) onto the outer surface of the extruded previously irradiated tube and then orient the resultant. This sequence allows for the ionizing irradiative treatment of the first and later layer or layers without subjecting the PVDC barrier layer to the harmful discoloration effects thereof.

Ionizing irradiation of the bag film, if desired, may be accomplished by the use of high energy electrons, ultra violet radiation, X-rays, gamma rays, beta particles etc. Preferably, electrons are employed up to about 20 megarads (Mr) dosage level. The irradiation source can be any electron beam generator operating in a range of about 150 kilovolts to about 6 megavolts with a power output capable of supplying the desired dosage. Many apparatus for irradiating of films are known to those of skill in the art. The irradiation is usually carried out at a dosage between about 1 Mr (10 kilogrey) and about 20 Mr (200 kilogrey), with a preferred dosage range of about 2 Mr (20 kilogrey) to about 12 Mr (120 kilogrey). Ionizing irradiation can be carried out conveniently at room temperature, although higher and lower temperatures, for example, 0° C. to 60° C. may be employed.

Many polymers are suitable for the other layers of the bag films. For instance polyolefins such as linear low density polyethylene (LLDPE), very or ultra low density linear polyethylene (VLDPE) (generally density is 0.910 g/cc or less), polypropylene (PP), ethylene/butyl acrylate copolymer (EBA). ethylene/vinyl acetate copolymer (EVA), ethylenepropylene copolymer (EPC), or nylon may be employed. Also blends of these may be employed.

The film sheet or tube may be formed into bags or pouches and thereafter utilized to package a product. In this case, if the film has been formed as a tube it may be preferable first to slit the tubular film to form a film sheet and thereafter form the sheet into bags or pouches. Thus, the bag may be end-sealed or side-sealed, either version having an open neck through which the product is inserted, and then the open neck is clipped or heat sealed closed. Such bag or pouch forming methods, likewise, are well known to those of skill in the art. Typically, using a machine such as the Cryovac ® 8300 or Furukawa 8150, a product is placed in the bag, the bag is vacuumized and then the open neck of the bag is sealed with heat seal bars.

With material of the heat-shrinkable type, then after wrapping, the enclosed product is subjected to elevated temperatures, for example, by passing the enclosed product through a hot air tunnel or placing the enclosed product in hot water. This causes the enclosing heat shrinkable film to shrink around the product to produce a tight wrapping that closely conforms to the contour of the product. For best appearance, the conformation should be as close as possible to the contour of the product. For a shrink-wrapped package, with the present invention, excess bag material between the end seal and the food product is reduced to such an extent as to be virtually eliminated, and often is completely eliminated. This minimization of excess material results in fewer or no wrinkles, and the shrink-wrapped package does not develope a shopworn appearance.

The gap is substantially prevented. By the term "substantially prevented", it is intended to mean that the gap between the food product and the film is less than about ⅛ inch (about 0.32 cm), and in the preferred embodiment there is no gap. The gap is substantially prevented by subjecting the packaged product to non-ionizing radiation, preferably microwaving radiation, prior to heat-shrinking. The film is relatively transparent to non-ionizing, preferably microwave, radiation. The power level of the non-ionizing radiation should range from about 500 watts to about 25 kwatts, and may go up to as high as about 200 kwatts for some industrial applications. The frequency may range from about 915 megahertz to about 2450 megahertz, with 915 and 2450 being typical as these are ISM assigned frequencies (frequencies assigned by the U.S. government for Industrial/Scientific/Medical uses). Typical home use microwave apparatus range from about 500 watts to about 1500 watts, with 700 watts being very exemplary. Industrial use microwave apparatus typically range from abut 25 kwatts to about 150 kwatts. The time for the non-ionizing radiation should range from about 250 seconds down to about 1 second or less, more preferably about 120 seconds to about 3 seconds. The power and time are inversely proportional, and thus greater power is needed if less time for irradiating is desired. This can readily be determined by one of ordinary skill in the art without undue experimentation. A typical industrial scale apparatus would microwave 60 packages per minute by running on a conveyor 3 rows across of 20 each at 150 kwatts at a frequency of 915 megahertz for 3 seconds per package.

The non-ionizing radiation should occur about 10 minutes or less, more preferably about 5 minutes or less, most preferably about 1 minute or less prior to the heat-shrinking, but may occur 1 hour or even more before the heat-shrinking. For economic reasons, it is desired to have the procedure in-line whereby the non-ionizing radiation is substantially immediately followed by the heat-shrinking.

The following examples are intended to illustrate the preferred embodiments of the invention and it is not intended to limit the invention thereby.

EXAMPLE

Biaxially heat-shrinkable, side-sealed, barrier bags of about 10 inches×14 inches were made from tubular films that were made by using the extrusion coating process as described in U.S. Pat. No. 3,741,253, mentioned above. The bag films were of 4 layers, comprising the following polymeric materials in order from inside sealing layer to outside abuse layer: a first (sealing) layer comprising EVA, a second layer comprising EVA, a third (barrier) layer comprising PVDC-MA, and a fourth (abuse) layer comprising EVA. Layers 1 and 2 were electron beam irradiated between 4 and 6 Mr prior to extrusion coating of layers 3 and 4. The bag films had a transverse shrink from about 30 to 45% and a longitudinal shrink from about 20 to 35%. The thickness of the bag films was U-gauge (about 2.0 mils or 50.8 um) for treatments A, B, E and F, and the thickness was T-gauge (about 2.4 mils or 61 um) for treatments C and D, as designated below.

Eight hams were packaged for each of treatments A, B, C, D, E, and F, making a total of 48 packaged hams. Each ham was about 4–5 pounds (1.8 to 2.3 kg) in weight. Each ham was inserted through the bag open neck and placed horizontally in the bag. Then, the bags were vacuumized and heat sealed closed using a curved seal bar, except the 8 packaged hams subjected to E treatment were vacuumized twice and then heat sealed. This packaging of the hams was accomplished using a Furukawa 8150 single chamber vacuum apparatus. The 8150 is described in U.S. Pat. No. 4,586,320, the disclosure of which is incorporated herein by reference. Treatments A–E were prior art comparisons, and treatment F was according to the present invention. These treatments were as described in Table A below:

TABLE A

| Designation Letter | Treatment Description |
|---|---|
| Comparison A | Vacuumized, Sealed, Shrink |
| Comparison B | Vacuumized, Sealed, 25-minute hold, Shrink |
| Comparison C | Vacuumized, Sealed, Shrink |
| Comparison D | Vacuumized, Sealed, Shrink |
| Comparison E | Vacuumized, Vacuumized, Sealed, Shrink |
| Test F | Vacuumized, Sealed, Microwaved, Shrink |

The shrinking was accomplished by manually placing the packaged ham in a dip tank model ST-K of water at 200° F. (93.3° C.) for 2 seconds. The microwaving of the 8 packaged hams of F samples was accomplished by manually placing the 8 packaged hams in a Ricar Model RM-580, 700 watt, microwave oven and microwaving on high (full power) for 1 minute, 50 seconds. Then, by manually placing all the packaged hams against a ruler, the amount of excess material between the ham and the seal closure of the bag was measured. The results of the measurements are summarized in Table B.

TABLE B

| Treatment Designation Letter | Ham # | Applied Seal to Ham Distance (Inches) | | Difference | |
|---|---|---|---|---|---|
| | | Pre-Shrink | Post-Shrink | Inches | % |
| A | 1 | 1 | 1/2 | 1/2 | 50 |
| | 2 | 1 | 1/2 | 1/2 | 50 |
| | 3 | 7/8 | 1/4 | 5/8 | 71 |
| | 4 | 3/4 | 1/4 | 1/2 | 67 |
| | 5 | 3/4 | 1/4 | 1/2 | 67 |
| | 6 | 3/4 | 1/4 | 1/2 | 67 |
| | 7 | 7/8 | 5/16 | 9/16 | 64 |
| | | 9/8 | 1/2 | 1/2 | 56 |
| | Aver. | 0.89 | 0.35 | 0.54 | 61 |
| B | 1 | 1/2 | <1/8 | 3/8 | 75 |
| | 2 | 9/8 | 3/8 | 6/8 | 67 |
| | 3 | 3/4 | <1/8 | 5/8 | 83 |
| | 4 | 1 | 1/4 | 3/4 | 75 |
| | 5 | 9/8 | 3/8 | 6/8 | 67 |
| | 6 | 7/8 | 3/8 | 4/8 | 57 |
| | 7 | 7/8 | 0 | 7/8 | 100 |
| | | 15/16 | 1/4 | 11/16 | 73 |
| | Aver. | 0.90 | 0.24 | 0.66 | 73 |
| C | 1 | 1 | 1/2 | 1/2 | 50 |
| | 2 | 1 | <1/4 | 3/4 | 75 |
| | 3 | 3/4 | 1/8 | 5/8 | 83 |
| | 4 | 3/4 | 1/8 | 5/8 | 83 |
| | 5 | 13/16 | 1/4 | 9/16 | 69 |
| | 6 | 3/2 | 1/2 | 1 | 67 |

TABLE B-continued

| Treatment Designation Letter | Ham # | Applied Seal to Ham Distance (Inches) Pre-Shrink | Post-Shrink | Difference Inches | % |
|---|---|---|---|---|---|
| | 7 | 7/8 | 1/8 | 6/8 | 86 |
| | | 7/8 | 1/4 | 5/8 | 71 |
| | Aver. | 0.95 | 0.27 | 0.68 | 72 |
| D | 1 | 7/8 | 5/16 | 9/16 | 64 |
| | 2 | 13/16 | 7/16 | 6/16 | 46 |
| | 3 | 7/8 | 1/4 | 5/8 | 71 |
| | 4 | 17/16 | 1/2 | 9/16 | 53 |
| | 5 | 17/16 | 7/16 | 10/16 | 59 |
| | 6 | 3/4 | 3/8 | 3/8 | 50 |
| | 7 | 1 | 7/16 | 9/16 | 56 |
| | | 7/8 | 3/8 | 4/8 | 57 |
| | Aver. | 0.96 | 0.39 | 0.57 | 59 |
| E | 1 | 3/4 | 1/8 | 5/8 | 83 |
| | 2 | 7/8 | 1/8 | 6/8 | 86 |
| | 3 | 7/8 | 3/8 | 4/8 | 57 |
| | 4 | 1 | 3/8 | 5/8 | 63 |
| | 5 | 1 | 1/8 | 7/8 | 88 |
| | 6 | 3/4 | 1/4 | 2/4 | 67 |
| | 7 | 5/8 | 1/8 | 4/8 | 80 |
| | | 5/8 | 1/8 | 4/8 | 80 |
| | Aver. | 0.81 | 0.22 | 0.59 | 73 |
| F | 1 | 3/4 | 0 | 3/4 | 100 |
| | 2 | 5/8 | 0 | 5/8 | 100 |
| | 3 | 7/8 | 0 | 7/8 | 100 |
| | 4 | 3/4 | 1/8 | 5/8 | 83 |
| | 5 | 7/8 | 0 | 7/8 | 100 |
| | 6 | 5/8 | 0 | 5/8 | 100 |
| | 7 | 1 | 0 | 1 | 100 |
| | | 1 | 0 | 1 | 100 |
| | Aver. | 0.81 | 0.02 | 0.79 | 98 |

As can be seen, for F, i.e. microwave treatment according to the invention, the seal to ham distance for 7 out of 8 samples was reduced to 0. For 1 out of 8 samples, namely for sample 4, the seal to ham distance was reduced to only ⅛ inch. The average percentage reduction was 98%. This is substantially better than the average percentage reduction of only comparison samples A), 73% (comparison samples B), 72% (comparison samples C), 59% (comparison samples D), and 73% (comparison samples E).

What is claimed is:

1. A shrink package having improved food product to container fit comprising:
a heat-shrinkable container including a heat-shrinkable flexible thermoplastic envelope substantially conformed to a contained food product and having been treated with non-ionizing microwave radiation and then heat shrunk, said non-ionizing radiation being to an extent sufficient to cause substantially complete contact after the heat shrinking of the inner surface of the envelope and the product whereupon gap therebetween is less than about 0.32 cm.

2. The shrink package at claim 1 wherein said container is treated with non-ionizing radiation from a level of about 500 watts to a level of about 200 kwatts.

3. The shrink package of claim 1 wherein said container is treated with non-ionizing radiation from about 250 seconds to about 1 second.

4. The shrink package of claim 1 wherein said food product is meat.

5. A method to improve food product to container fit of a shrink package comprising:
(a) providing a heat-shrinkable container including a heat-shrinkable flexible thermoplastic envelope and a contained food product enclosed therein,
(b) treating said container with non-ionizing microwave radiation, and
(c) heat-shrinking said container, whereupon the inner surface of the envelope and the food product are in substantially complete contact with gap therebetween being less than about 0.32 cm.

6. The method of claim 5 wherein the non-ionizing radiation is level of about 500 watts to a level of about 200 kwatts.

7. The method of claim 5 wherein said container is treated with non-ionizing radiation from a level of about 500 watts to a level of about 200 kwatts.

8. The method of claim 5 wherein said food product is meat.

9. A method of improving food product to container fit of a shrink package comprising heat-shrinking a container wherein said container is provided by a heat-shrinkable container including heat-shrinkable, flexible thermoplastic envelope and a contained food product enclosed therein, said container containing said food product having been treated with non-ionizing microwave radiation.

10. A shrink package having improved food product to container fit comprising:
a heat-shrinkable container including a biaxially heat-shrinkable flexible thermoplastic barrier envelope of at least the 3-layer film structure: polyolefin/polyvinylidene chloride copolymer/polyolefin substantially conformed to a contained meat product and having been treated with microwave radiation from a level of about 500 watts to a level of about 200 kwatts and then heat shrunk, said microwaving radiation causing substantially complete contact after the heat shrinking of the inner surface of the envelope and the product whereby gap therebetween is less than about 0.32 cm.

* * * * *

UNITED STATES PATENT AND TRADEMARK OFFICE
CERTIFICATE OF CORRECTION

PATENT NO. : 4,948,604

DATED : August 14, 1990

INVENTOR(S) : Richard O. Kuehne, Karl R. Deily, Timothy L. Lawlis

It is certified that error appears in the above-identified patent and that said Letters Patent is hereby corrected as shown below:

Column 8, lines 23-25, claim 6, delete "level of about 500 watts to a level of about 200 kwatts" and substitute therefor --from about 250 seconds to about 1 second--.

Signed and Sealed this

Twelfth Day of November, 1991

Attest:

HARRY F. MANBECK, JR.

Attesting Officer

Commissioner of Patents and Trademarks